United States Patent
Morita et al.

(10) Patent No.: US 6,309,992 B1
(45) Date of Patent: Oct. 30, 2001

(54) DIELECTRIC FORMING MATERIAL AND DIELECTRIC FORMING PASTE FOR USE IN PLASMA DISPLAY PANEL

(75) Inventors: Yoshiro Morita, Moriyama; Hiroyuki Oshita, Otsu; Masahiko Ohji, Moriyama; Kazuo Hadano, Otsu, all of (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/497,452

(22) Filed: Feb. 3, 2000

(30) Foreign Application Priority Data

Feb. 4, 1999 (JP) ................................................ 11-027746

(51) Int. Cl.$^7$ ............................... C03C 3/078; C03C 4/02
(52) U.S. Cl. ................................. 501/55; 501/53; 501/73; 106/712
(58) Field of Search .............................. 501/11, 53, 55, 501/73; 106/712, 676

(56) References Cited

U.S. PATENT DOCUMENTS

| | | | | |
|---|---|---|---|---|
| 5,089,444 | * | 2/1992 | Hattori et al. | 501/9 |
| 5,565,388 | * | 10/1996 | Krumwiede et al. | 501/70 |
| 5,688,727 | * | 11/1997 | Shelestak et al. | 501/71 |
| 5,942,331 | * | 8/1999 | Miyauchi et al. | 428/428 |
| 5,952,255 | * | 9/1999 | Seto et al. | 501/71 |

FOREIGN PATENT DOCUMENTS

03285841 * 12/1991 (JP).
11260272 * 9/1999 (JP).

* cited by examiner

Primary Examiner—Mark Kopec
(74) Attorney, Agent, or Firm—Collard & Roe, P.C.

(57) ABSTRACT

A dielectric forming material for use as a transparent dielectric layer formed on an inside surface of a front glass substrate in a plasma display panel comprises powder of colored glass. The powder of colored glass comprises a base glass and coloring ingredients added thereto. The coloring ingredients comprise CoO and NiO. The powder of colored glass provides a glass film having a spectral transmittance $T\%_{(460\ nm)}$ of 50–75% at the wavelength of 460 nm or a glass film having a spectral transmittance $T\%_{(460\ nm)}$ higher than a spectral transmittance $T\%_{(550\ nm)}$ at the wavelength of 550 nm and a spectral transmittance $T\%_{(620\ nm)}$ at the wavelength of 620 nm. The glass film is formed by applying the colored glass powder onto a soda lime glass plate having a thickness of 1.7 mm and by baking the colored glass powder to form a baked film having a thickness of 20–40 $\mu$m as the glass film.

4 Claims, 1 Drawing Sheet

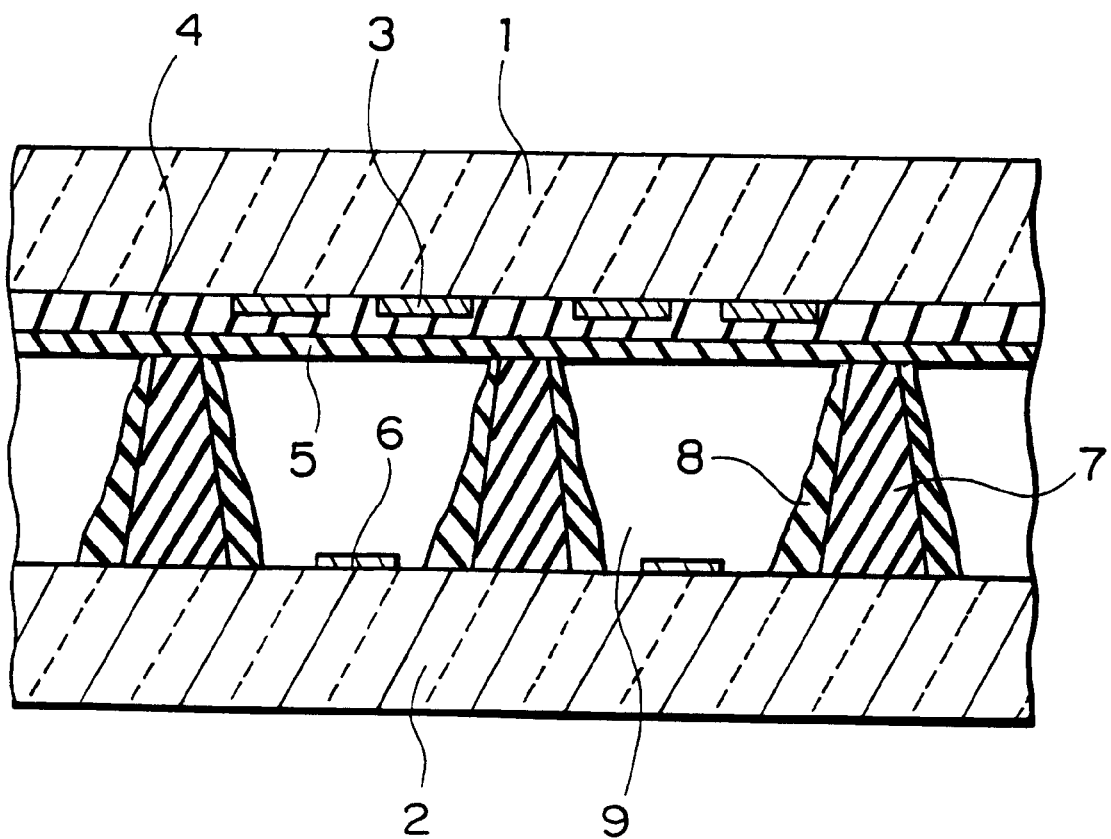

DIELECTRIC FORMING MATERIAL AND DIELECTRIC FORMING PASTE FOR USE IN PLASMA DISPLAY PANEL

BACKGROUND OF THE INVENTION

This invention relates to a dielectric forming material and a dielectric forming paste, each of which is for use as a transparent dielectric layer formed onto an inside surface of a front glass substrate in a plasma display panel.

An AC type plasma display panel (which may also be referred to as "PDP" hereunder)to which this invention is applicable comprises a front glass substrate for displaying a video image and a rear glass substrate opposed to the front glass substrate with a predetermined gap.

On one hand, the front glass substrate has a plurality of display electrodes and a transparent dielectric layer formed on its inside surface facing the rear glass substrate. The display electrodes are buried in the transparent dielectric layer. An MgO film is formed on a surface of the transparent dielectric layer. On the other hand, the rear glass substrate has a plurality of address electrodes formed on its inside surface facing the front glass substrate.

Between the MgO film on the front glass substrate and the inside surface of the rear glass substrate, a plurality of barrier ribs vertically protrude from the rear glass substrate to be erected thereon to define a plurality of inner spaces between adjacent ones of the barrier ribs. Each of the barrier ribs has a surface covered with a phosphor. An inner space or cavity surrounded by the front and the rear glass substrates is filled with a rare gas. As the glass substrate, use is generally made of a soda lime glass or a high-strain-point glass which has a strain point of 570° C. or more.

With this structure, when an electric voltage is applied to drive the PDP, electric discharge occurs between a selected one of the display electrodes and a selected one of the address electrodes so that ultraviolet rays are emitted from the rare gas. The ultraviolet rays excite the phosphor to emit visible light. The wavelength range of visible light is 620 nm for red, 550 nm for green, and 460 nm for blue.

The light emitted from the phosphor is transmitted through the front glass substrate and the transparent dielectric layer formed thereon. However, a part of the light is scattered on the inside surfaces of the front glass substrate and the transparent dielectric layer and repeatedly reflected on the inside and the outside surfaces thereof. In this event, the light undesiredly leaks into adjacent spaces beyond the barrier ribs. This results in a phenomenon that the video image becomes unclear because of occurrence of glow around a shining point or bright spot. Such phenomenon is generally called a halation.

SUMMARY OF THE INVENTION

It is therefore an object of the present invention to provide a plasma display panel material which enables manufacture of a plasma display panel (PDP) suppressed in possibility of occurrence of halation.

As a result of various extensive studies, the present inventors have found that the above-mentioned object is achieved by forming a transparent dielectric layer capable of decreasing a transmittance within the wavelength range of visible light, and hereby proposes this invention.

According to this invention, there is provided a dielectric forming material which is for use as a transparent dielectric layer formed on an inside surface of a front glass substrate in a plasma display panel, and which comprises powder of colored glass.

According to this invention, there is also provided a dielectric forming paste which is for use as a transparent dielectric layer formed on an inside surface of a front glass substrate in a plasma display panel and which is characterized by including powder of colored glass as a solid component.

The transparent dielectric layer is formed on the front glass substrate to the thickness of about 30–40$\mu$m in order to keep the discharge of the display electrodes. As a matter of course, the transparent dielectric layer is required to have a high breakdown voltage, an excellent transparency, and so on. For this purpose, use has generally been made of powder of a transparent glass such as a $PbO$—$B_2O_3$—$SiO_2$ glass or a $ZnO$—$B_2O_3$—$SiO_2$ glass.

On the other hand, the dielectric forming material according to this invention comprises powder of a so-called colored glass containing a base glass and coloring ingredients added thereto. Use of the colored glass decreases the transmittance of the light passing through the transparent dielectric layer within the wavelength range of visible light and enhances absorption of the scattered light. Accordingly, it is possible to suppress occurrence of halation. In addition, it is possible to improve the contrast in the video image.

Proposal is also made of a technique of coloring the transparent dielectric layer by adding pigment powder. However, this technique is not preferable because the transmittance of the transparent dielectric layer is significantly decreased.

As a result of the inventors' studies, it has been confirmed that the coloring ingredients preferably comprise $CoO$ and $NiO$ different in light absorption within the wavelength range of visible light. It has also been confirmed that, as the base glass, a $PbO$—$B_2O_3$—$SiO_2$ glass or a $ZnO$—$B_2O_3$—$SiO_2$ glass is preferable.

Moreover, it has been confirmed that the appropriate dielectric forming material provides a glass film having a spectral transmittance $T\%_{(460\ nm)}$ of 50–75% at the wavelength of 460 nm or which is higher than a spectral transmittance $T\%_{(550\ nm)}$ at the wavelength of 550 nm and a spectral transmittance $T\%_{(620\ nm)}$ at the wavelength of 620 nm. Herein, the glass film is prepared from the dielectric forming material in the following manner. Specifically, the dielectric forming material is applied to a soda lime glass plate having a thickness of 1.7 mm and then baked or fired to form a baked film having a thickness of 20–40 $\mu$m thickness as the glass film. Thereafter, the transmittance of the glass film is measured together with the glass plate.

BRIEF DESCRIPTION OF THE DRAWINGS

A sole FIGURE is a cross-sectional view of an AC type plasma display panel to which this invention is applicable.

DESCRIPTION OF THE PREFERRED EMBODIMENT

Referring to the FIGURE, an AC type plasma display panel to which this invention is applicable will at first be described.

The AC type plasma display panel (PDP) comprises a front glass substrate 1 for displaying a video image and a rear glass substrate 2 which is opposed to the front glass substrate 1 with a predetermined gap.

On one hand, the front glass substrate 1 has a plurality of display electrodes 3 and a transparent dielectric layer 4 formed on its inside surface facing the rear glass substrate 2. The display electrodes 3 are buried in the transparent dielectric layer 4. An MgO film 5 is formed on a surface of the transparent dielectric layer 4. On the other hand, the rear glass substrate 2 has a plurality of address electrodes 6 formed on its inside surface facing the front glass substrate 1. Between the MgO film 5 on the front glass substrate 1 and the inside surface of the rear glass substrate 2, a plurality of barrier ribs 7 protrude from the rear glass substrate 2 to be erected thereon to define a plurality of inner spaces between adjacent ones of the barrier ribs 7.

Each of the barrier ribs 7 has a surface covered with a phosphor 8. An inner space or cavity surrounded by the front glass substrate 1 and the rear glass substrate 2 is filled with a rare gas 9. As the glass substrate, use is generally made of a soda lime glass or a high-strain-point glass which has a strain point of 570° C.or more.

With this structure, when an electric voltage is applied to drive the PDP, electric discharge occurs between a selected one of the display electrodes 3 and a selected one of the address electrodes 6 so that ultraviolet rays are emitted from the rare gas 9. The ultraviolet rays excite the phosphor 8 to emit visible light. The wavelength range of visible light is 620 nm for red, 550 nm for green, and 460 nm for blue.

The light emitted from the phosphor 8 is transmitted through the front glass substrate 1 and the transparent dielectric layer 4 formed thereon. However, a part of the light is scattered on the inside surfaces of the front glass substrate and the transparent dielectric layer and repeatedly reflected on the inside and the outside surfaces thereof. In this event, the light undesiredly leaks into adjacent spaces beyond barrier ribs 7. This results in a phenomenon that the video image becomes unclear because of occurrence of glow around a shining point or bright spot. Such phenomenon is generally called a halation.

The present inventors have found that, in order to manufacture a plasma display panel suppressed in possibility of occurrence of halation, it is required to form a transparent dielectric layer capable of decreasing a transmittance within the wavelength range of visible light.

Hereinafter, description will be made about an embodiment of the present invention.

According to one embodiment of this invention, a dielectric forming material for use as a transparent dielectric layer formed on an inside surface of a front glass substrate in a plasma display panel comprises powder of colored glass. The colored glass essentially consists of a base glass and coloring ingredients added thereto.

As the coloring ingredients, use may be made of, for example, CoO and NiO in combination. CoO has light absorbing power in the wavelength range of visible light of 440–660 nm. The light absorbing power is smaller at a shorter wavelength.

NiO also has light absorbing power in the wavelength range of visible light of 440–660 nm. The light absorbing power is greater and smaller at a shorter wavelength and a longer wavelength, respectively. Accordingly, by adjusting the contents of CoO and NiO, it is possible to obtain desired light absorbing power in the wavelength range of visible light.

In case where CoO and NiO is used in combination, the content of CoO is preferably 0.01–1.0 wt % and the content of NiO is preferably 0.005–1.5 wt %. The reason why the contents of CoO and NiO are limited as mentioned above will be described below.

If the content of CoO is less than 0.01 wt %, the light absorbing power in the wavelength range of visible light is excessively small. On the other hand, if the content of CoO is more than 1.0 wt %, the light absorbing power is excessive so that the light emitted from the phosphor is undesiredly absorbed to considerably decrease the brightness.

In case where the content of NiO is less than 0.005 wt %, the light absorbing power in the wavelength range of visible light is excessively small.

On the other hand, in case where the content of NiO exceeds 1.5 wt %, the light absorbing power is excessive so that the light beam emitted from the phosphor is undesiredly absorbed to considerably decrease the brightness. Thus, it is most preferable that the content of CoO is 0.05–0.8% by weight and the content of NiO is 0.03–0.8% by weight.

In the meanwhile, a color display panel has a disadvantage that the luminous efficiency of a blue phosphor is lower than those of other phosphors. Therefore, if the transmittance of the transparent dielectric layer is uniformly decreased, the light emitted from the blue phosphor is absorbed in the manner similar to the light emitted from the other phosphors, the brightness of the video image or picture is unfavorably degraded.

Under the circumstances, it is preferable that the light transmittance at the wavelength corresponding to the luminescent color of the blue phosphor is higher than those of the red and the green phosphors. For this purpose, the content of NiO is limited so that the weight ratio of NiO/CoO is not greater than 2.5 (NiO/CoO$\leq$2.5). In this manner, it is possible to reduce the absorption of the light having the wavelength corresponding to the luminescent color of the blue phosphor and, therefore, to obtain the light transmittance higher than that for each of the wavelengths corresponding to red and green.

Preferably, the base glass comprises a $PbO-B_2O_3-SiO_2$ glass or a $ZnO-B_2O_3-SiO_2$ glass. Specially, a glass having any one of the following compositions is preferable as the base glass because such glass is excellent in flowability, insulating property, and stability after baking at a temperature of 500–600° C.

A first preferred glass is a $PbO-B_2O_3-SiO_2$ glass essentially consisting of, by weight percent, 50–75% (preferably 55–73%) PbO, 2–30% (preferably 5–25%) $B_2O_3$, 2–35% (preferably 3–31%) $SiO_2$, and 0–20% (preferably 0–10%) ZnO.

A second preferred glass is a $PbO-B_2O_3-SiO_2$ glass essentially consisting of, by weight percent, 20–50% (preferably 25–45%) PbO, 10–40% (preferably 15–35%) $B_2O_3$, 1–15% (preferably 2–10%) $SiO_2$, 0–30% (preferably 10–30%) ZnO, and 0–30% (preferably 3–25%) CaO+BaO+$Bi_2O_3$.

A third preferred glass is a $ZnO-B_2O_3-SiO_2$ glass essentially consisting of, by weight percent, 20–45% (preferably 25–40%) ZnO, 10–35% (preferably 17–30%) $B_2O_3$, 0.5–10% (preferably 3–9%) $SiO_2$, 20–60% (preferably 25–55CaO+SrO+BaO+$Bi_2O_3$, and 0–25% (preferably 0–20%) PbO.

Moreover, it is preferable that the dielectric forming material according to this invention satisfies the following condition, regardless of whether or not CoO and NiO are used as the coloring ingredients.

Specifically, the dielectric forming material preferably provides a glass film having a spectral transmittance $T\%_{(460\ nm)}$ of 50–75% at the wavelength of 460 nm. If the spectral transmittance $T\%_{(460\ nm)}$ is less than 50%, the brightness is decreased because the luminescent color of the blue phosphor becomes weak. If the spectral transmittance $T\%_{(460\ nm)}$ is higher than 75%, the effect of suppressing the halation is decreased. Herein, the glass film is prepared from the dielectric forming material in the following manner. The dielectric forming material is applied by printing or the like onto a soda lime glass plate having a thickness of 1.7 mm and is then baked at a temperature of 500–600° C. during 10–30 minutes to form a baked film having a thickness of 20–40 μm as the glass film. Thereafter, the transmittance of the glass film is measured together with the glass plate.

Furthermore, it is preferable that the spectral transmittance $T\%_{(460\ nm)}$ at the wavelength of 460 nm is higher than the spectral transmittance $T\%_{(550\ nm)}$ at the wavelength of 550 nm and the spectral transmittance $T\%_{(620\ nm)}$ at the wavelength of 620 nm. If the spectral transmittance $T\%_{(460\ nm)}$ is lower than the spectral transmittances $T\%_{(550\ nm)}$ and $T\%_{(620\ nm)}$, the luminescent color of the blue phosphor becomes relatively weak so that the brightness is decreased.

The dielectric forming material according to this invention includes the above-mentioned powder of colored glass (hereinafter simply called colored glass powder) as a major solid component. It is noted here that a mixture of a plurality of kinds of colored glass powder can be used. In addition to the colored glass powder, the dielectric forming material may include 50 wt % or less uncolored glass powder or 20 wt % or less filler powder as a solid component.

In case where the dielectric forming material according to this invention is used, the manner of application onto a substrate and the mode of use may be appropriately determined taking various conditions into consideration. Typically, the dielectric forming material is kneaded with a solvent or a binder to obtain a paste which is applied by screen printing, and so on. Alternatively, use may be made of various other methods such as a green sheet method in which the dielectric forming material is molded into a green sheet to be attached to a substrate.

EXAMPLES

Hereinafter, the dielectric forming material according to this invention will be described in detail in conjunction with specific examples.

Tables 1 to 3 show examples (Samples Nos. 1 to 13) of this invention and a comparative example (Sample No. 14).

TABLE 1

| | Examples | | | | |
|---|---|---|---|---|---|
| Sample No. | 1 | 2 | 3 | 4 | 5 |
| Glass Composition (wt %) | | | | | |
| PbO | 62 | 62 | 60 | 70 | 70 |
| $B_2O_3$ | 10 | 10 | 20 | 17 | 17 |
| $SiO_2$ | 18 | 18 | 9 | 10 | 10 |
| ZnO | 5 | 5 | 8 | 3 | 3 |
| CaO | 5 | 5 | — | — | — |
| SrO | — | — | 3 | — | — |
| CoO | 0.2 | 0.6 | 0.2 | 0.3 | 0.08 |
| NiO | 0.1 | 0.6 | 0.1 | 0.2 | 0.1 |
| Coefficient of Thermal Expansion ($\times 10^{-7}$/° C.) | 76.5 | 77.0 | 81.0 | 82.0 | 81.5 |
| Softening Point (° C.) | 580 | 585 | 565 | 510 | 510 |
| Thickness of Baked Film (μm) | 29 | 30 | 28 | 30 | 30 |
| Spectral Transmittance (%) | | | | | |
| 460nm | 69 | 62 | 71 | 66 | 73 |
| 550nm | 67 | 59 | 69 | 64 | 72 |

TABLE 1-continued

| | Examples | | | | |
|---|---|---|---|---|---|
| Sample No. | 1 | 2 | 3 | 4 | 5 |
| 620nm | 67 | 56 | 68 | 63 | 72 |
| Color Tone of Glass Film | Blue | Dark Blue | Blue | Blue | Light Blue |

TABLE 2

| | Examples | | | | |
|---|---|---|---|---|---|
| Sample No. | 6 | 7 | 8 | 9 | 10 |
| Glass Composition (wt %) | | | | | |
| PbO | 30 | 40 | — | — | — |
| $B_2O_3$ | 20 | 25 | 20 | 20 | 17 |
| $SiO_2$ | 5 | 3 | 5 | 5 | 5 |
| ZnO | 25 | 22 | 40 | 40 | 30 |
| $Bi_2O_3$ | 5 | — | 5 | 5 | 30 |
| CaO | — | 10 | 10 | 10 | — |
| BaO | 15 | — | 20 | 20 | 18 |
| CoO | 0.3 | 0.3 | 0.8 | 0.15 | 0.2 |
| NiO | 0.3 | 0.1 | 0.5 | 0.08 | 0.15 |
| Coefficient of Thermal Expansion ($\times 10^{-7}$/° C.) | 79.0 | 80.5 | 77.5 | 77.0 | 82.0 |
| Softening Point (° C.) | 565 | 560 | 570 | 570 | 545 |
| Thickness of Baked Film (μm) | 28 | 29 | 28 | 32 | 27 |
| Spectral Transmittance (%) | | | | | |
| 460nm | 66 | 68 | 58 | 70 | 68 |
| 550nm | 64 | 65 | 55 | 67 | 66 |
| 620nm | 62 | 63 | 53 | 65 | 65 |
| Color Tone of Glass Film | Blue | Blue | Dark Blue | Blue | Blue |

TABLE 3

| | Examples | | | Comparative Example |
|---|---|---|---|---|
| Sample No. | 11 | 12 | 13 | 14 |
| Glass Composition (wt %) | | | | |
| PbO | 10 | 20 | 62 | 62 |
| $B_2O_3$ | 25 | 25 | 10 | 10 |
| $SiO_2$ | 5 | 8 | 18 | 18 |
| ZnO | 30 | 23 | 5 | 5 |
| CaO | — | — | 5 | 5 |
| BaO | 30 | 24 | — | — |
| CoO | 0.3 | 0.1 | 0.1 | — |
| NiO | 0.15 | 0.1 | 0.3 | — |
| Coefficient of Thermal Expansion ($\times 10^{-7}$/° C.) | 75.0 | 78.0 | 76.5 | 76.0 |
| Softening Point (° C.) | 575 | 560 | 580 | 580 |
| Thickness of Baked Film (μm) | 30 | 31 | 28 | 29 |
| Spectral Transmittance (%) | | | | |
| 460nm | 70 | 74 | 63 | 77 |
| 550nm | 66 | 72 | 65 | 78 |
| 620nm | 65 | 72 | 65 | 78 |
| Color of Glass Film | Blue | Light Blue | Grayish Blue | Colorless |

Each sample was prepared in the following manner.

At first, various kinds of oxides and carbonates were mixed to satisfy each glass composition shown in the tables. The mixture was put into a platinum crucible and melted at a temperature of 1000–1400° C. for two hours. A resultant glass melt was formed into a film. The film was pulverized and classified to obtain a desired powder sample.

The classification was carried out by the use of a 45 μm-mesh filter. Each sample of glass powder was evaluated for the coefficient of thermal expansion, the softening point, the film thickness of the glass film obtained by baking, the spectral transmittance, and the color tone.

The coefficient of thermal expansion was obtained as follows. The glass powder was baked at the softening point to obtain a glass body. The glass body was polished into a cylinder having a diameter of 4 mm and a length of 40 mm. Then, measurement was made according to JIS (Japanese Industrial Standard) R3102. Thereafter, the coefficient of thermal expansion within the temperature range of 30–300° C. was obtained. The softening point was measured by a macroscopic differential thermal analyzer and the value of the fourth inflection point was adopted as the softening point.

The spectral transmittance was measured as follows. At first, each sample of glass powder was mixed with 5% ethyl cellulose solution in terpineol as a solvent and then kneaded by a three-roll mill to produce a paste.

Thereafter, the paste was applied by screen printing onto a soda lime glass plate (spectral transmittances of 90.5% at 460 nm, 91.0% at 550 nm, 90.5% at 620 nm) having a thickness of 1.7 mm, put into an electric furnace, and held for 10 minutes at a temperature around the softening point to be baked. Thus, a glass film having a thickness of about 30–40 μm was formed.

By the use of a micrometer, the thickness of the glass film obtained by baking was exactly measured. Then, the glass plate with the glass film formed thereon was measured for the spectral transmittances. Specifically, by the use of an integrating sphere of the spectral photometer UV–3100 which was manufactured and sold by Shimadzu Corporation in Japan, the spectral transmittances were obtained at the wavelengths of 460 nm (blue), 550 nm (green), and 620 nm (red).

The coefficient of thermal expansion, the softening point, the spectral transmittance, and the color tone are shown in the tables. In the tables, the content of each component is represented by weight percent.

As is obvious from the tables, each of the samples Nos. 1 through 13 according to this invention produced a transparent glass film having a color tone of blue and had the coefficient of thermal expansion of 76.5–82.0×10$^{-7}$° C. and the softening point of 510–585° C. Thus, each sample was suitable as a transparent dielectric forming material. On the other hand, the sample No. 14 as the comparative example had the characteristics similar to those of the samples Nos. 1 through 13 but produced a colorless transparent glass film after baking.

Next, for use in a plasma display panel, two high-strain-point glass substrates having a predetermined size were prepared as front and rear glass substrates. Then, display electrodes and address electrodes were baked on the glass substrates.

On the surface of the front glass substrate, the glass paste was printed and baked to form a dielectric layer having a thickness of about 30 μm. Herein, the glass paste was prepared in the manner similar to that described in conjunction with the measurement of the spectral transmittance.

On the other hand, on the rear glass substrate, barrier ribs and phosphors were formed. Subsequently, these glass substrates were sealed by the use of a sealing glass having a low melting point. Thereafter, an inner space between the glass substrates was filled with a gas mixture of xenon and neon as a main discharge gas and was sealed airtight. Thus, the AC type plasma display panel was manufactured.

When the AC type plasma display panel manufactured as described above was operated, the display panel using any one of the samples Nos. 1 through 12 always provided a clear image. No halation was observed and the brightness was high. In the display panel using the sample No. 13, no halation was observed although the brightness was not so high.

In contrast, in the display panel using the sample No. 14, a displayed image was partially unclear and the occurrence of halation was confirmed.

As described above, the transparent dielectric layer is formed on the front glass substrate of the plasma display panel by the use of the dielectric forming material or the dielectric forming paste according to this invention. In this event, it is possible to absorb the scattered light scattered on the inside and the outside surfaces of the dielectric layer and the front glass substrate. Accordingly, occurrence of halation can be considerably suppressed. As a result, it is possible to manufacture the plasma display panel which provides a clear image.

What is claimed is:

1. A dielectric forming material for use as a transparent dielectric layer formed on an inside surface of a front glass substrate in a plasma display panel, said dielectric forming material comprising powder of colored glass which essentially consists of a base glass and coloring ingredients added thereto, said coloring ingredients comprising CoO and NiO, and said colored glass is selected from the group consisting of (1) a glass containing 50–70 wt % PbO, 2–30 wt % $B_2O_3$, 2–35 wt % SiO2, and 0–20 wt. % ZnO;

(2) a glass containing 20–50 wt % PbO, 10–40 wt % $B_2O_3$, 1–55 wt % $SiO_2$, 0–30 wt % ZnO, and 0–30 wt % CaO+BaO+$Bi_2O_3$; and (3) a glass containing 0–25 wt % PbO, 10–35 wt % $B_2O_3$, 0.5–10 wt % $SiO_2$, 20–45 wt % ZnO, and 20–60 wt % CaO+SrO+BaO+$Bi_2O_3$.

2. A dielectric forming material as claimed in claim 1, wherein the content of CoO is 0.05–0.8 wt % and the content of NiO is 0.03–0.8 wt %.

3. A dielectric forming material as claimed in claim 1, wherein the content of CoO is 0.01–1.0 wt % and the content of NiO is 0.005–1.5 wt %.

4. A dielectric forming material as claimed in claim 1, wherein the contents of CoO and NiO satisfy the relationship given by CoO/NiO≦2.5 in weight ratio.

* * * * *